(12) United States Patent
Niemeijer et al.

(10) Patent No.: US 10,115,194 B2
(45) Date of Patent: Oct. 30, 2018

(54) SYSTEMS AND METHODS FOR FEATURE DETECTION IN RETINAL IMAGES

(71) Applicant: IDx, LLC, Iowa City, IA (US)

(72) Inventors: Meindert Niemeijer, Prairie Village, KS (US); Ryan Amelon, North Liberty, IA (US); Warrent Claride, Cedar Rapids, IA (US); Michael D. Abramoff, University Heights, IA (US)

(73) Assignee: IDx, LLC, Coralville, IA (US)

( * ) Notice: Subject to any disclaimer, the term of this patent is extended or adjusted under 35 U.S.C. 154(b) by 163 days.

(21) Appl. No.: 15/092,421

(22) Filed: Apr. 6, 2016

(65) Prior Publication Data

US 2016/0292856 A1    Oct. 6, 2016

Related U.S. Application Data

(60) Provisional application No. 62/143,301, filed on Apr. 6, 2015.

(51) Int. Cl.
| | |
|---|---|
| *G06K 9/00* | (2006.01) |
| *G06T 7/00* | (2017.01) |
| *G06K 9/66* | (2006.01) |
| *G06K 9/46* | (2006.01) |
| *G06K 9/62* | (2006.01) |

(52) U.S. Cl.
CPC .......... *G06T 7/0012* (2013.01); *G06K 9/4604* (2013.01); *G06K 9/6257* (2013.01); *G06K 9/66* (2013.01); *G06T 2207/20081* (2013.01); *G06T 2207/20084* (2013.01); *G06T 2207/30041* (2013.01)

(58) Field of Classification Search
CPC ............ G06K 9/66; G06T 2207/20081; G06T 2207/20084; G06T 2207/30041
See application file for complete search history.

(56) References Cited

U.S. PATENT DOCUMENTS

| | | | | |
|---|---|---|---|---|
| 5,153,923 | A * | 10/1992 | Matsuba | G06N 3/04 358/1.1 |
| 5,557,686 | A * | 9/1996 | Brown | G06F 21/316 340/5.51 |
| 8,965,112 | B1 * | 2/2015 | Ibarz | G06K 9/6256 382/105 |
| 9,754,219 | B1 * | 9/2017 | Brestoff | G06N 99/005 |
| 9,881,234 | B2 * | 1/2018 | Huang | G06K 9/6232 |

(Continued)

*Primary Examiner* — Gandhi Thirugnanam
(74) *Attorney, Agent, or Firm* — Davis, Brown, Koehn, Shors & Roberts, P.C.; Matthew W. Coryell (57) ABSTRACT

Provided is a method for training a neural network to detect features in a retinal image. The method may include the steps of: combining and randomizing feature images into a Training data set; combining and randomizing the feature images into a testing dataset; training a plurality of neural networks having different architectures using a subset of the training dataset while testing on a subset of the testing dataset; identifying the best neural network based on each of the plurality of neural networks performance on the testing data set; inputting images to the best neural network and identifying a limited number of false positives and false negative and adding the false positives and false negatives to the training dataset and testing dataset; and repeating the foregoing steps until an objective performance threshold is reached.

18 Claims, 8 Drawing Sheets

(56) References Cited

U.S. PATENT DOCUMENTS

| | | | | |
|---|---|---|---|---|
| 2003/0133605 A1* | 7/2003 | Tannhof | ............... | G06T 3/4046 |
| | | | | 382/156 |
| 2004/0068199 A1* | 4/2004 | Echauz | ............... | A61B 5/0476 |
| | | | | 600/544 |
| 2005/0129306 A1* | 6/2005 | Wang | ............... | G06T 3/403 |
| | | | | 382/156 |
| 2006/0251293 A1* | 11/2006 | Piirainen | ............... | B60N 2/002 |
| | | | | 382/104 |
| 2010/0278420 A1* | 11/2010 | Shet | ............... | G06K 9/00369 |
| | | | | 382/156 |
| 2011/0091083 A1* | 4/2011 | Liu | ............... | A61B 3/12 |
| | | | | 382/128 |
| 2012/0155726 A1* | 6/2012 | Li | ............... | A61B 3/1173 |
| | | | | 382/128 |
| 2014/0355861 A1* | 12/2014 | Nirenberg | ............... | H04N 19/85 |
| | | | | 382/133 |
| 2016/0071266 A1* | 3/2016 | Srivastava | ............... | G06T 7/0012 |
| | | | | 382/130 |
| 2016/0104058 A1* | 4/2016 | He | ............... | G06F 17/30247 |
| | | | | 382/156 |
| 2016/0171346 A1* | 6/2016 | Han | ............... | G06K 9/66 |
| | | | | 382/103 |
| 2016/0217586 A1* | 7/2016 | Dickrell, III | ............... | G06T 7/11 |
| 2016/0292856 A1* | 10/2016 | Niemeijer | ............... | G06T 7/0012 |
| 2017/0147905 A1* | 5/2017 | Huang | ............... | G06K 9/6232 |

\* cited by examiner

FIG. 1

High level steps for leveraging CNN feature detection for disease detection in retinal images 1) Create spatial maps of disease feature cnn outputs 2) Train CNN that feed into MLP to generate disease output

FIG. 2

Alternative steps for leveraging CNN feature detection for disease detection in retinal images 1) Create scalar representations of disease features 2) Train MLP to generate disease output

SYSTEMS AND METHODS FOR FEATURE DETECTION IN RETINAL IMAGES

CROSS-REFERENCE TO RELATED APPLICATION(S)

This application claims priority from U.S. Provisional Application No. 62/143,301, filed Apr. 6, 2015, which is hereby incorporated herein by reference in its entirety for all purposes.

FIELD OF THE INVENTION

Disclosed herein are systems and methods for retinal feature detection, learning, and classification for the purpose of retinal disease detection.

BACKGROUND OF THE INVENTION

Detecting, segmenting and classifying objects and other structures of interest in a background retinal, and even any other medical, image is crucial for detection and diagnosis of disease, its absence, as well as for biometrics. Deep neural networks (NNs), including Convolutional Neural Networks, as well as other types of multilevel neural networks, are an existing method for improved feature learning, classification, and detection. They have been applied to a wide range of different image types, including medical images). However, the straightforward use of NNs to classify entire retinal images or image subsets (patches) for these tasks, as is the art in other problems, may not lead to maximized performance in retinal images. This is because the problem is underconstrained: there is a large variance in color, structure, and texture of the normal retina as well as a large diversity of objects, and a large variability in shapes, colors, textures, and other features of these objects, versus a relatively sparse number of retinal images with annotations at a sufficient level, that these machine learning algorithms require for optimal performance. Medical images with annotations are sparse and expensive, because it both ultimately derives from patients so there are ethical concerns that prevent an unlimited number of images to be obtained, as well annotating these images which requires experts in that field, in contrast with other domains especially in computer vision where NNs are typically can be trained on unlimited number of images can be obtained and annotation can typically be done by any adult.

To tackle this, other approaches have introduced additional variance into the object samples by translating, rotating and otherwise deforming patches or samples artificially. However, this still does not introduce sufficient 'real' variance, in both objects, as well as backgrounds. Accordingly, there is a need in the art for a process for creating, training and applying NNs to retinal images in order to maximally successfully detect objects in backgrounds related to disease detection in a way that is useful for retinal disease detection in patients.

BRIEF SUMMARY OF THE INVENTION

Disclosed herein are systems methods and devices for diagnosing disease in medical images. In certain aspects, disclosed is a method for training a neural network to detect features in a retinal image including the steps of: a) extracting one or more features images from a Train_0 set, a Test_0 set, a Train_1 set and a Test_1 set; b) combining and randomizing the feature images from Train_0 and Train_1 into a Training data set; c) combining and randomizing the feature images from Test_0 and Test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a set of false positives (positive confounders) and a set false negatives (negatives confounders) and adding the false positives and false negatives to the training dataset and testing dataset; and g) repeating steps d)-g) until an objective performance threshold is reached. Other embodiments of this aspect include corresponding computer systems, apparatus, and computer programs recorded on one or more computer storage devices, each configured to perform the actions of the methods.

Further disclosed herein is a system for detecting lesions in a retinal image including: a) a feature extractor, configured to receive retinal image input from a user, and further configured to extract image features from the retinal image, which can be a multilevel neural network or a classic feature extractor; b) a multilevel neural network, trained according to the training methods disclosed herein and configured to receive image features from the feature extractor, and further configured to output scalar image features; and c) a machine learning program, configured to receive scalar image features from the neural network and further configured to output disease diagnosis. In certain aspects, the image features are spatial distributions of image features. In further aspects, spatial distributions are heat maps. According to still further aspects, the spatial distributions are point-wise outputs.

One general aspect includes a computing device for diagnosing disease in a retinal image including: a) a processor; b) a memory that includes: i) a feature extractor system ii) a neural network; iii) a machine learning program; and iv) instructions that, when executed by the processor, cause the processor to perform acts including: receiving a retinal image and providing the retinal image to the feature extractor; extracting image features and providing image features to the neural network; generating scalar features from the image features; providing scalar features to the machine learning program; and determining whether disease is present in the retinal image. Other embodiments of this aspect include corresponding computer systems, apparatus, and computer programs recorded on one or more computer storage devices, each configured to perform the actions of the methods.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data are provided in a number of different formats, and that these data, represent endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15.

Optional" or "optionally" means that the subsequently described event or circumstance may or may not occur, and that the description includes instances where said event or circumstance occurs and instances where it does not.

An "image" is defined as a reproduction or imitation of the form of a person or thing, or specific characteristics thereof, in digital form. An image can be, but is not limited to, a JPEG image, a PNG image, a GIF image, a TIFF image, or any other digital image format known in the art. "Image" is used interchangeably with "photograph."

An "object" is defined as a tangible entity with defined borders contained within a digital photograph. An object can be a pixel or a group of pixels.

A "feature(s)" is defined as a group of one or more descriptive characteristics of objects that can discriminate for disease. A feature can be a numeric attribute.

A "set of features" is defined as a customized group of one or more descriptive characteristics of objects which most accurately classify objects indicative of disease.

A "threshold" is defined as a level, point, or value above which something is true or will take place and below which it is not or will not, such levels, points, or values include probabilities, sizes in pixels, and values representing pixel brightness.

"Thresholding" is defined as modifying pixels that contain a characteristic either above or below a selected threshold value.

As used herein, "Train_0" means a set of images that have been reviewed by one or more experts as not having the Feature of Interest anywhere within the image. These images are used exclusively in the training dataset. This data should be selected from a general dataset containing many different sources.

As used herein, "Test_0" means a set of images that have been reviewed by one or more experts as not having the Feature of Interest anywhere within the image. These images are used exclusively in the testing dataset. This data should be selected from a general dataset containing many different sources.

As used herein, "Train_1" means a set of images that have the Feature of Interest labeled by an expert. These images are separated for use exclusively in the training dataset. This data should be selected from a general dataset containing many different sources.

As used herein, "Test_1" means a set of images that have the Feature of Interest labeled by an expert. These images are separated for use exclusively in the testing dataset. This data should be selected from a general dataset containing many different sources.

As used herein, "Feature of Interest" means the object(s) in a retinal image which the multilevel neural network is being trained to recognize. The feature of interest is generally a retinal image object that is indicative of disease and may include but is not limited to microaneurysms, dot hemorrhages, flame-shaped hemorrhages, sub-intimal hemorrhages, sub-retinal hemorrhages, pre-retinal hemorrhages, micro-infarctions, cotton-wool spots, and yellow exudates.

As used herein, "Feature Image" means a vector image (or image stack). At the most basic level this may be the color planes of an image (e.g. RGB image would be a Feature Image with vector length of 3). Other Feature Images may include a variety of pre-processed versions of the input image.

As used herein, "Epoch 1" means a complete cycle through a dataset wherein every sample and label is presented to the network for training/testing.

As used herein, "Positive sample" means a sample that contains an instance of what is trying to be detected.

As used herein, "Negative sample" means a sample that does not contain an instance of what is trying to be detected.

As used herein, "Confounder Sample" a sample that causes a false-positive or false-negative outcome from a multilevel neural network including convolutional neural networks.

Disclosed herein are systems methods and devices for diagnosing disease in medical images. In certain aspects, disclosed is a method for training a neural network to detect features in a retinal image including the steps of: a) extracting one or more features images from a Train_0 set, a Test_0 set, a Train_1 set and a Test_1 set; b) combining and randomizing the feature images from Train_0 and Train_1 into a Training data set; c) combining and randomizing the feature images from Test_0 and Test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a limited number of false positives and false negative and adding the false positives and false negatives to the training dataset and testing dataset; and g) repeating steps d)-g) until an objective performance threshold is reached. Other embodiments of this aspect include corresponding computer systems, apparatus, and computer programs recorded on one or more computer storage devices, each configured to perform the actions of the methods.

According to certain embodiments, the feature extracting step further includes sampling a region of interest (ROI). In certain aspects, sampling is performed by random sampling. In further aspects, sampling is performed by grid sampling. According to still further aspects, the disclosed method further comprises the step of resampling the images of Train_0, Test_0, Train_1 and Test_1 after the identification of the best neural network with a sampling method different from the sampling method performed in the initial sampling. In yet further aspects, images undergo preprocessing prior to the step of extracting one or more Feature Images. According to still further aspects, the objective performance threshold is softmax_loss, mean squared error, area under the ROC curve or accuracy. According to certain aspects, the method further includes the steps of: a) creating a spatial distribution of features in an image; and b) inputting the spatial distribution of features into a neural network trained according to steps (a)-(f), where the output of the neural network is disease diagnosis. According to further aspects, the spatial distribution of features is a heat map. According to yet further aspects, the spatial distribution of features is a point-wise output from feature detection. In certain aspects, the step of creating a spatial distribution of features in an image further includes creating scalar features. In certain aspects, the scalar features are created as histograms. The method further including training a machine learning algorithm, where the input is scalar features and the output is disease diagnosis.

Further disclosed herein is a system for detecting lesions in a medical image including: a) a feature extractor, configured receive retinal image input from a user, and further configured to extract image features from the retinal image; b) a neural network, trained according to the training methods disclosed herein and configured to receive image features from the feature extractor, and further configured to output scalar image features; and c) a machine learning program, configured to receive scalar image features from the neural network and further configured to output disease diagnosis. In certain aspects, the image features are spatial distributions of image features. In further aspects, spatial distributions are heat maps. According to still further aspects, the spatial distributions are point-wise outputs.

One general aspect includes a computing device for diagnosing disease in a medical image including: a) a processor; b) a memory that includes: i) a feature extractor system ii) a neural network; iii) a machine learning program; and iv) instructions that, when executed by the processor, cause the processor to perform acts including: receiving a medical image and providing the medical image to the feature extractor; extracting image features and providing image features to the neural network; generating scalar features from the image features; providing scalar features to the machine learning program; and determining whether disease is present in the medical image. Other embodiments of this aspect include corresponding computer systems, apparatus, and computer programs recorded on one or more computer storage devices, each configured to perform the actions of the methods.

In certain aspects computing device is a remotely accessible server. In further aspects, the neural network of the disclosed computing device has been trained with steps including: a) extracting one or more features images from a Train_0 set, a Test_0 set, a Train_1 set and a Test_1 set; b) combining and randomizing the feature images from Train_0 and Train_1 into a training data set; c) combining and randomizing the feature images from test_0 and test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a limited number of false positives and false negative and adding the false positives and false negatives to the training dataset and testing dataset; and g) repeating steps d)-g) until an objective performance threshold is reached. Implementations of the described techniques may include hardware, a method or process, or computer software on a computer-accessible medium.

Disclosed herein are systems and methods which are applied to medical images. In certain embodiments, the disclosed systems and methods are applied in a comprehensive automated retinal disease screening system that takes one or more retinal images of a single patient, applies the method to each of the images to detect a variety features related to disease, and then combines the results with the outputs of more classical disease detection methods using a combination method into a single number indicating the likelihood of the presence of disease. This disclosure demonstrates a process for creating, training and applying CNNs to retinal images in order to successfully detect features related to disease detection in a way that is useful for retinal disease detection in patients. Further, the same general method is able to combine features for the purpose of diagnosing disease from the detected features.

Retinal lesion detection algorithms using a classic detection pipeline, wherein image information is processed by a candidate detector; then a candidate segmentor; then a feature extractor; then a classifier, are well known. The systems and methods disclosed herein are an improvement on classic detection methods. The disclosed system provides for the application of a feature learning and detection/classification method, deep neural networks to the detection and localization of features relating to retinal disease in retinal images. The amount of data normally required to obtain good results from deep networks is challenging in medical images, the disclosed systems and methods implement several innovations to make deep learning on medical images with limited ground-truth maximally effective.

The conventional approach is limited by the user's ability to identify features that they deem important to the classical system's method for classification through intuition. The instantly disclosed systems and methods allows the system to generate features, some of which may not be intuitive even to the expert, from more general representations of the usefulness for the detection, localization and classification of features, particularly disease features, in the retina. Other approaches have used statistical methods to generate such features, for example, by using a maximum variance objective function. However such an objective function does not guarantee an optimal solution on a more suitable metric, namely a detection or classification performance metric as is used by the multilevel neural network including convolutional neural networks.

The iterative nature used for dataset generation with positive and negative confounders allows for the system's influences to be updated with less common and more difficult to classify samples. This is a critical step for the application to retinal images that, by their nature, vary widely in appearance due to anatomical differences between subjects. Further variation is added by differences between cameras and operator skill levels. Since only a limited set of manually, expert annotated data is available, this step is critical in order to achieve generalizable results on large datasets.

The aspects of the disclosed method that set it apart from current systems and processes known in the art include, but are not limited to: 1) the steps needed to extract positive and negative samples; 2) the way in which samples are augmented within the dataset to achieve satisfactory detection results; 3) the way the datasets are iteratively updated to increase the influence of less common confounders in the training process and 4) the way in which detection and classification results are combined for patient level disease diagnosis; 5) the dataset produced in the final iteration of this invention is more suitable for discovery and training of other CNN architectures by relative over-representation of confounder samples.

The embodiments described herein relate generally to diagnostic medical images. Although any type of medical image can be used, these embodiments will be illustrated in conjunction with retinal images. However, the disclosed methods systems and devices can also be used with medical images of other ocular structures, or any other biological tissues the image of which can support the diagnosis of a disease condition. Furthermore, the methods disclose herein can be used with a variety of imaging modalities including but not limited to: computed tomography (CT), magnetic resonance imaging (MRI), computed radiography, magnetic resonance, angioscopy, optical coherence tomography, color flow Doppler, cystoscopy, diaphanography, echocardiography, fluoresosin angiography, laparoscopy, magnetic resonance angiography, positron emission tomography, single-photon emission computed tomography, x-ray angiography, nuclear medicine, biomagnetic imaging, culposcopy, duplex Doppler, digital microscopy, endoscopy, fundoscopy, laser surface scan, magnetic resonance spectroscopy, radiographic imaging, thermography, and radio fluroscopy.

Creating a CNN for Feature Detection

The following disclosed methods are applied to create and refine a deep NN for feature detection in retinal images.

1. Feature Image Extraction

Figure 1:
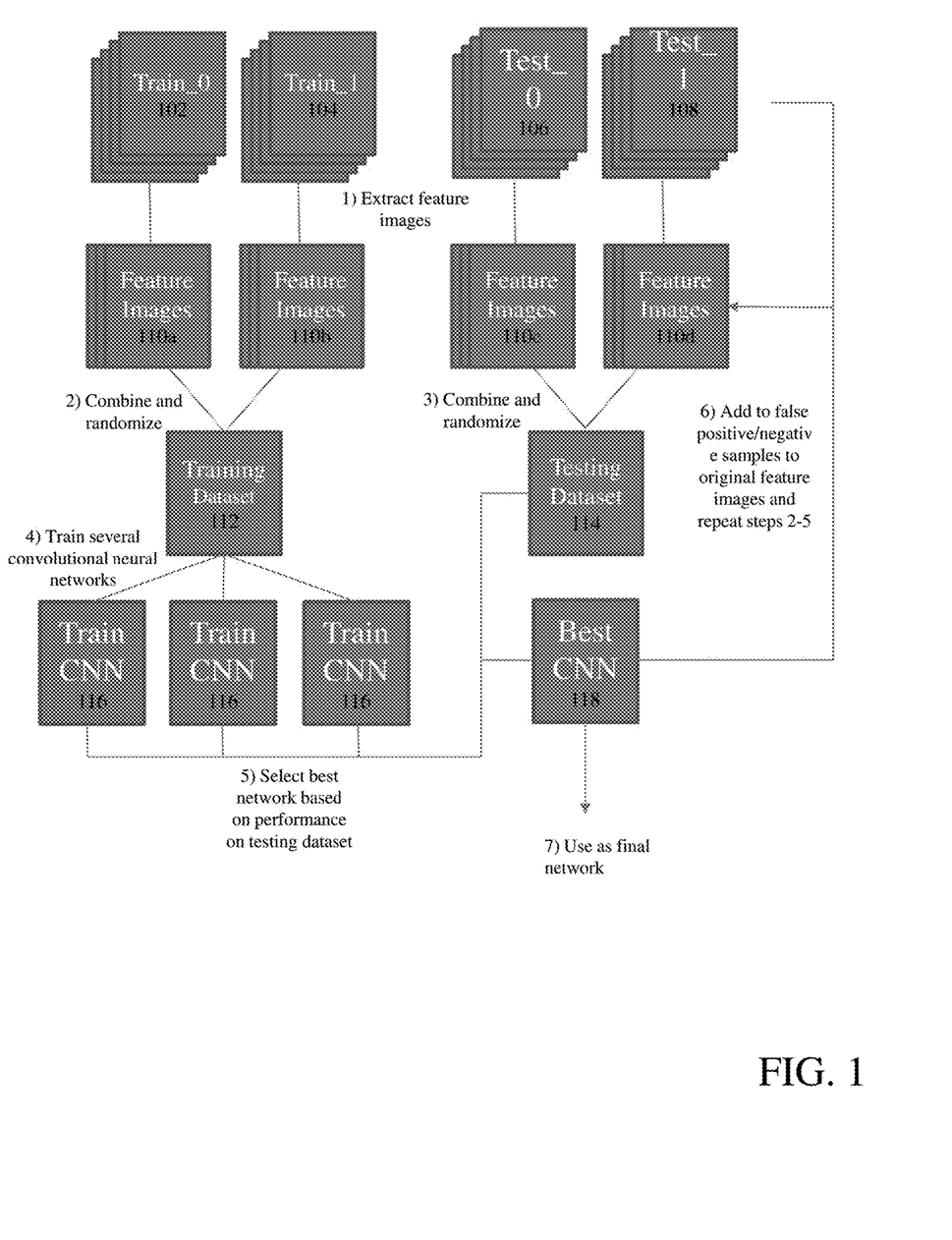
FIG. 1 is a flowchart of disclosed methods, according to certain embodiments.
Figure 4:
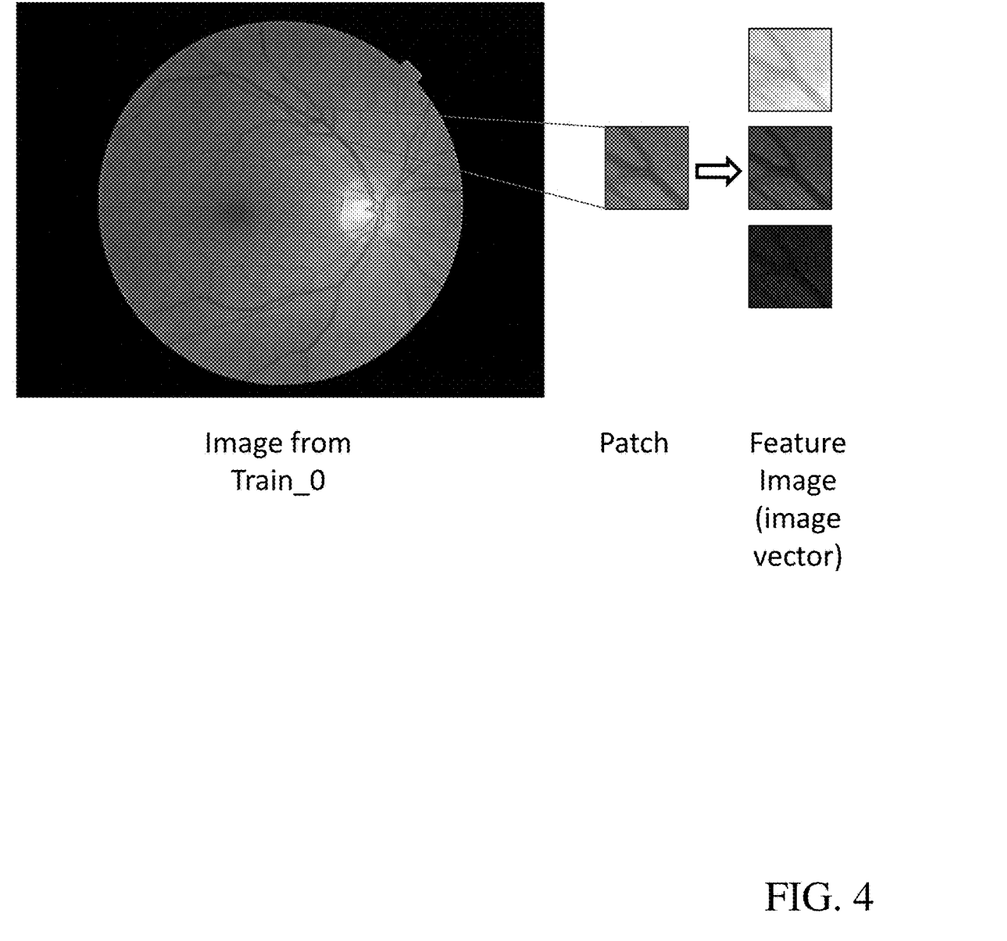
FIG. 4 is exemplary retinal image and Feature Image, according, to certain embodiments.
Figure 5:
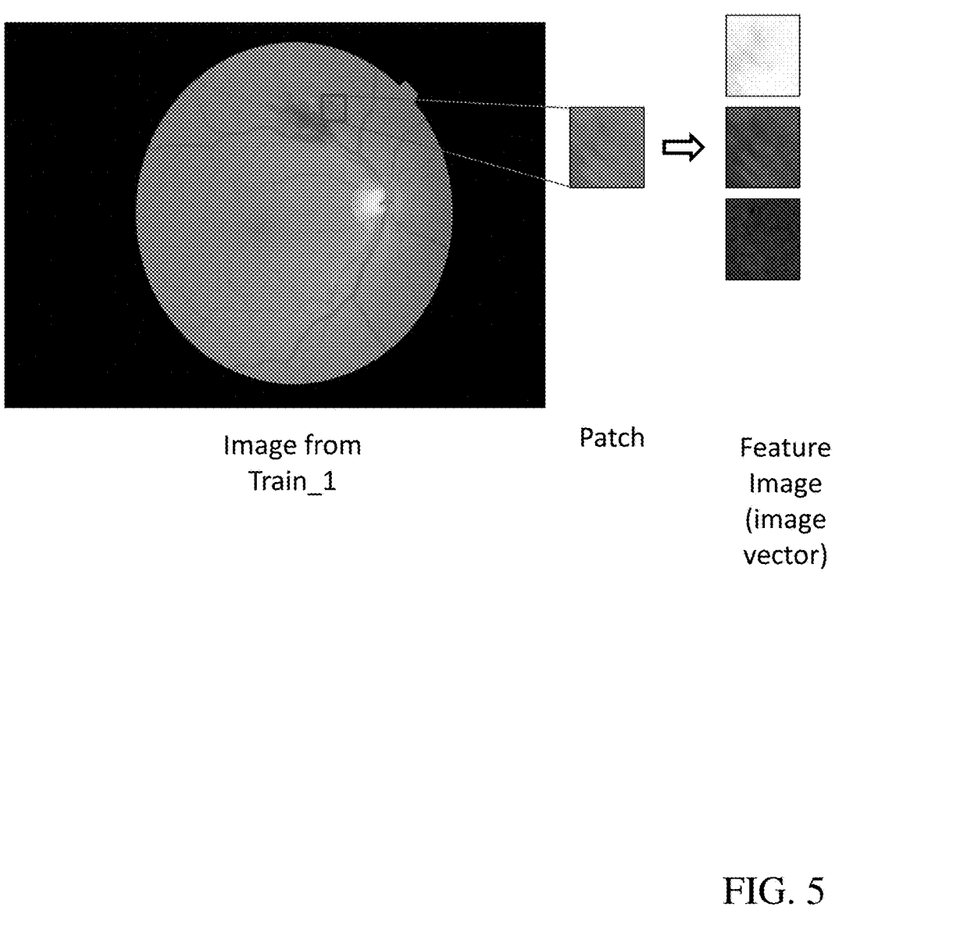
FIG. 5 is exemplary retinal image and Feature Image, according to certain embodiments.

As shown in the flow chart of FIG. 1, a limited number of Feature Images 110a-d are extracted from each of Train_0 102, Test_0 106, Train_1 104 and Test_1 108. Feature image extraction involves sampling a region of interest (ROI) from the image. FIG. 4 shows a representative sample of ROI sampling from Train_0, with the ROI identified as "patch." FIG. 4 shows a representative sample of ROI sampling from Train_1, with the ROI identified as "patch." According to certain embodiments, the limited number of Feature Images 110 are randomly sampled from the image. According to further embodiments, the limited number of Feature Images are structurally sampled, such as by way of grid-sampling, from the image. In the case of images with disease marked as ground truth, target sampling may be used to sample only certain desired points, such as regions marked by experts.

In certain implementations, Feature Image extraction may be constrained such that the entirety of the image is within the field-of-view. Alternatively, techniques may be applied to allow for reliable extraction of Feature Images that lie partially outside the field-of-view, such as mirroring pixel intensities across the field-of-view boundary.

According to certain embodiments, the Feature Images may undergo preprocessing, prior to feature extraction. The preprocessing step may comprise steps such as image normalization, background normalization, or color plane manipulation. Other preprocessing steps known in the art are also possible.

According to certain implementations, disease features may be extracted and placed on a normalized image to create an enhanced source image. A large problem specific to retinal images is variation in the background of the image due to variation in the image acquisition process and anatomical differences between individuals. To increase the robustness of the trained NN against such influences, lesions and disease features can be isolated from images containing disease and placed in normal images that exhibit certain kinds of background variation. These enhanced source images are then treated as positive image during the Feature Image extraction steps. This disease feature transfer can be accomplished by either image processing methods or by building a (deep) model.

Importantly, if the source image contains disease features, only positive samples are extracted. This is important as it removes the necessity to identify every disease feature in the image.

Several methods may be used to determine if a Feature Image has disease in the image using a marked ground truth. For example, if at least N points in the central x % of the sample patch is marked as disease, then a positive determination is made. Values for N can be 1 or higher and values of x can be any value greater than 0.

According to certain implementations, an additional data augmentation step is performed. In these implementations, a data augmentation step may be applied to a set or subset of the sampled patches. Exemplary data augmentation steps include but are not limited to modifying the sampled patch in a controlled manner such as flipping, scaling, rotating, translating or saturating a feature(s) within the Feature Image. Saturation of a feature within the Feature Image means substantially reducing the contrast of that channel of the Feature Image. This is especially helpful for retinal images as the red plane in retinal images is occasionally fully saturated.

2. Combine and Randomize the Feature Images from Train_0 102 and Train_1 104

Following the Feature Image extraction step, Feature Images 110 from Train_0 110a and Train_1 110b are combined and randomized, including the Feature Image augmentations (if any) into a training dataset 112.

3. Combine and randomize the Feature Images from Test_0 110c and Test_1 110d, including Feature Image augmentations, into a testing dataset 114.

4. Train a plurality of NNs 116 with different architectures using (part of) the training dataset 112 while testing on (part of) the testing dataset 114.

Once the training dataset 112 and the testing dataset 114 are defined, they are used to train and test a plurality of NNs 116. The architectures of the plurality of NNs may be predefined, or iteratively defined using an optimization algorithm such as provided by a hyperparameter optimization method. In certain embodiments, the initial training runs are performed with only a subset of the training dataset and testing dataset.

5. Select the Best NN(s).

The selection of the best NN is based on a pre-defined objective function, e.g. on the ability to separate the positive from negative samples within the test dataset 114. Values that may be an indicator of class separation include softmax_loss, mean squared error, area under the ROC curve or accuracy.

6. Run the Best NN(s) on the Original Train_0 102, Test_0 106, Train_1 104 and Test_1 108.

In certain implementations, following the selection of the best NN(s) 118, those selected can then be run on the original Train_0 102, Test_0 106, Train_1 104 and Test_1 108. A limited number of false positives and/or false negatives, known as positive and negative confounders are selected to add to the training set and testing set, as no single example should exist in either sets. While adding data, it is important to randomize the samples for more effective NN optimization.

According to certain embodiments, the sampling scheme can be changed from the initial sampling method. This provides an effective method to find positive and negative confounders. For instance, if grid sampling was originally used, off-setting the grid will make it so samples are not duplicated in the train or test set. Augmentation of the confounder samples using methods defined above is effective to increase the number of confounder samples in the training set which in turn increases their influence on the NN training. This can be effective to increase the influence of confounder samples even if they are uncommon.

7. (for confounder training) Re-run steps 5-7 as many times as necessary to obtain satisfactory results on some performance measure, e.g. good results for the final patient level disease classification.

Leveraging NN Feature Detection for Disease Detection in Retinal Images

Figure 2:
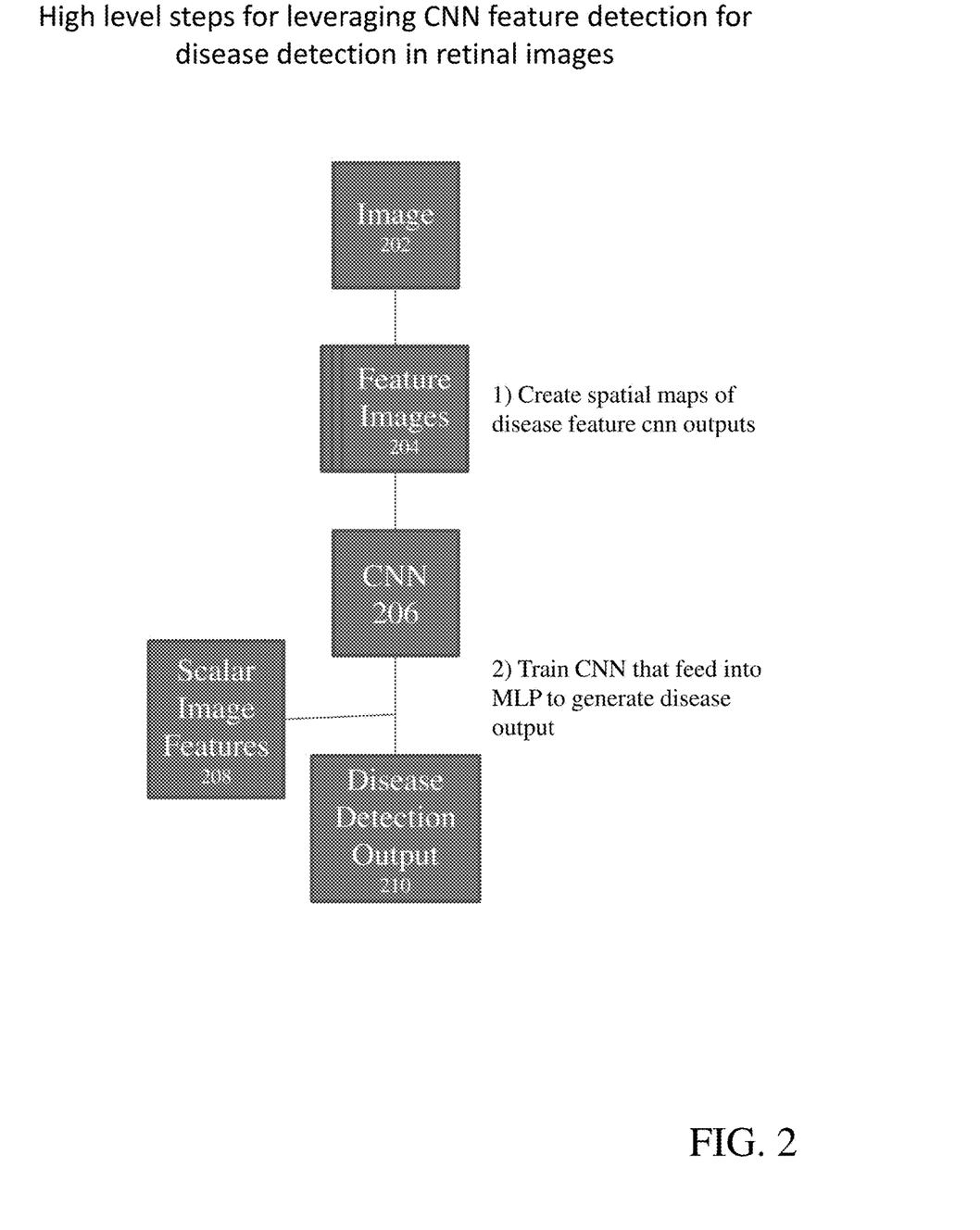
FIG. 2 is a flowchart of disclosed methods, according to certain embodiment.

Once one or more of the plurality of NNs are trained according to the methods disclosed above, the trained NNs can be utilized for disease detection in retinal images 202 according to at least the following methods, best shown in FIG. 2.

1. Spatial Distribution of Features in an Image

For all features, feature detection of images 204 is performed to get a spatial distribution of features in the image. These spatial distributions may be created in a variety of ways. In certain embodiments, spatial distribution is created as point-wise outputs from feature detection. In certain alternative embodiments, spatial distribution of features in the image is provided by creation of heat maps. Heat maps are created by spreading the influence of the feature detection at a point over an area (either over a distance or the entirety of the initial Feature Image space). In both cases, the heat maps may be post-processed using techniques such as blurring, sharpening, or other techniques known in the art.

2. Train a NN 206 with input using the same procedure as above where the input is, in part, the spatial feature maps and the output is a disease diagnosis 210.

Once the spatial distribution of features in an image is established, a NN can be leveraged by inputting the spatial feature map into the NN 206 and outputting a disease diagnosis. The confounder training mechanism still applies.

Figure 3:
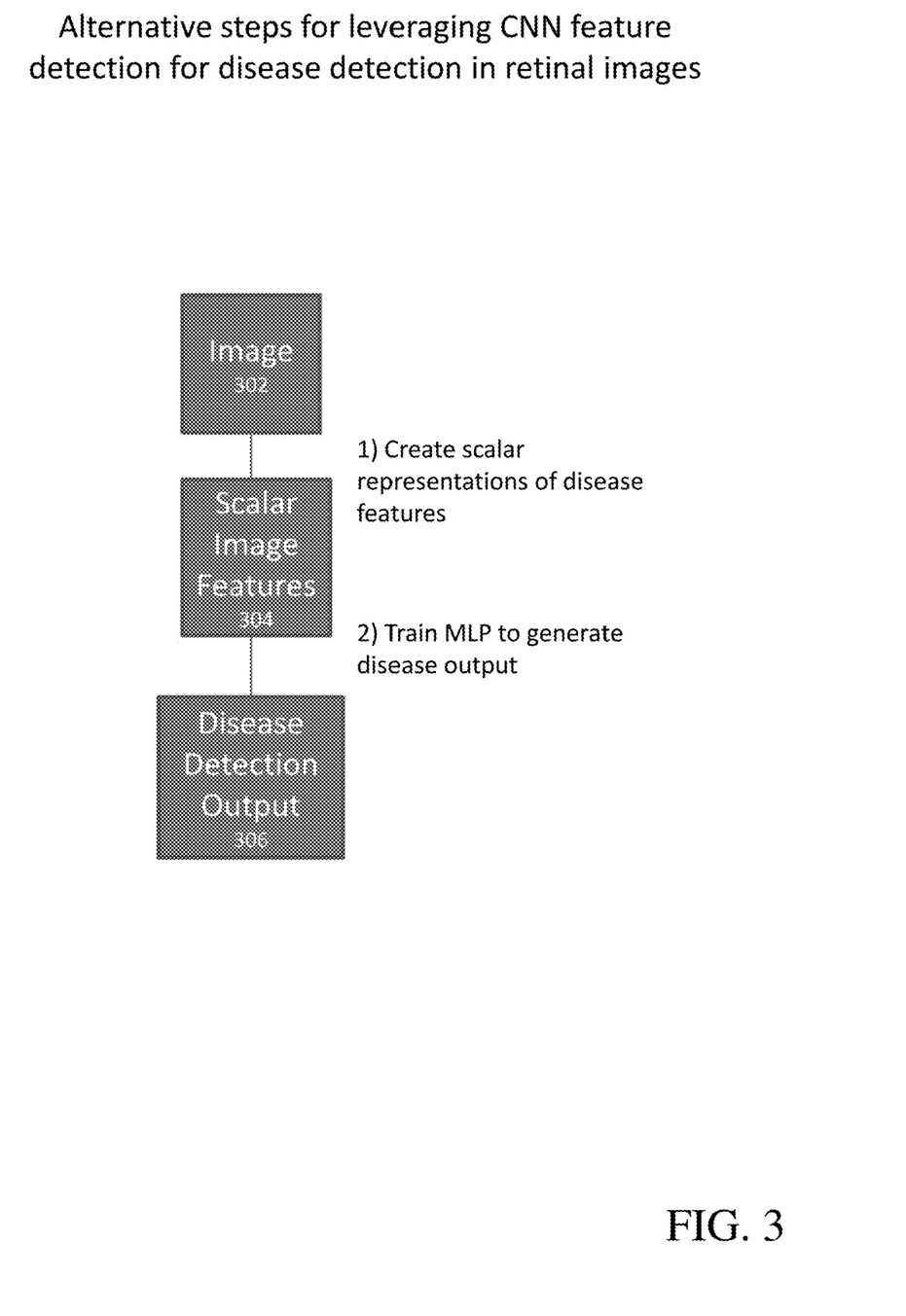
FIG. 3 is a flowchart of disclosed methods, according to certain, embodiment.

Alternative Steps for Leveraging NN Feature Detection for Disease Detection in Retinal Images According to certain alternative embodiments, once one or more of the plurality of NNs are trained according to the methods disclosed above, the trained NNs can be utilized for disease detection in retinal images according to at least the following methods, best shown in FIG. 3.

1. For all Features, Perform Feature Detection of Images 302 to Get a Spatial Distribution of Features in the Image.

These spatial distributions may be created in a variety of ways. In certain embodiments, spatial distribution is created as point-wise outputs from feature detection. In certain alternative embodiments, spatial distribution of features in the image is provided by creation of heat maps. Heat maps are created by spreading the influence of the feature detection at a point over an area (either over a distance or the entirety of the initial Feature Image space). In both cases, the heat maps may be post-processed using techniques such as blurring, sharpening, or other techniques known in the art.

2. Create Scalar Features from the Spatial Feature Maps

Once the spatial feature maps are created, the feature maps can be used to create scalar features 304 using, for instance, histograms. As the feature map also provides information about the location of the detected disease features, this location information could be included in the extracted scalar features 304. In certain embodiments, it may be desirable to skip step 1 and simply convert the output of feature detection directly into scalar features, bypassing the creation of a spatial feature map. Regardless of whether or not a feature map is created, the location information stays available.

3. Train a Conventional Machine Learning Algorithm where the Output is a Disease Diagnosis 306 or Staging.

According to further embodiments, the disclosed method further comprises chaining together a plurality of trained CNN systems. In these embodiments, each of the trained CNN performs a subtask required for the analysis. The outputs of each of the CNNs is then and classifying the outputs together into a single image or patient level output that combines these inputs using a classifier or CNN. The conventional approach in the art is to leverage CNNs to tackle the entire problem, which especially with sparse data in medical imaging leads to intractable processing times. Here however, the task is subdivided into different detection/segmentation/classification tasks that are each trained optimally as provided in the disclosed methods, and are then tied together into a second stage. This can be repeated in multiple stages. Further, this allows, for the use of the same training images for all different modules.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Figure 6:
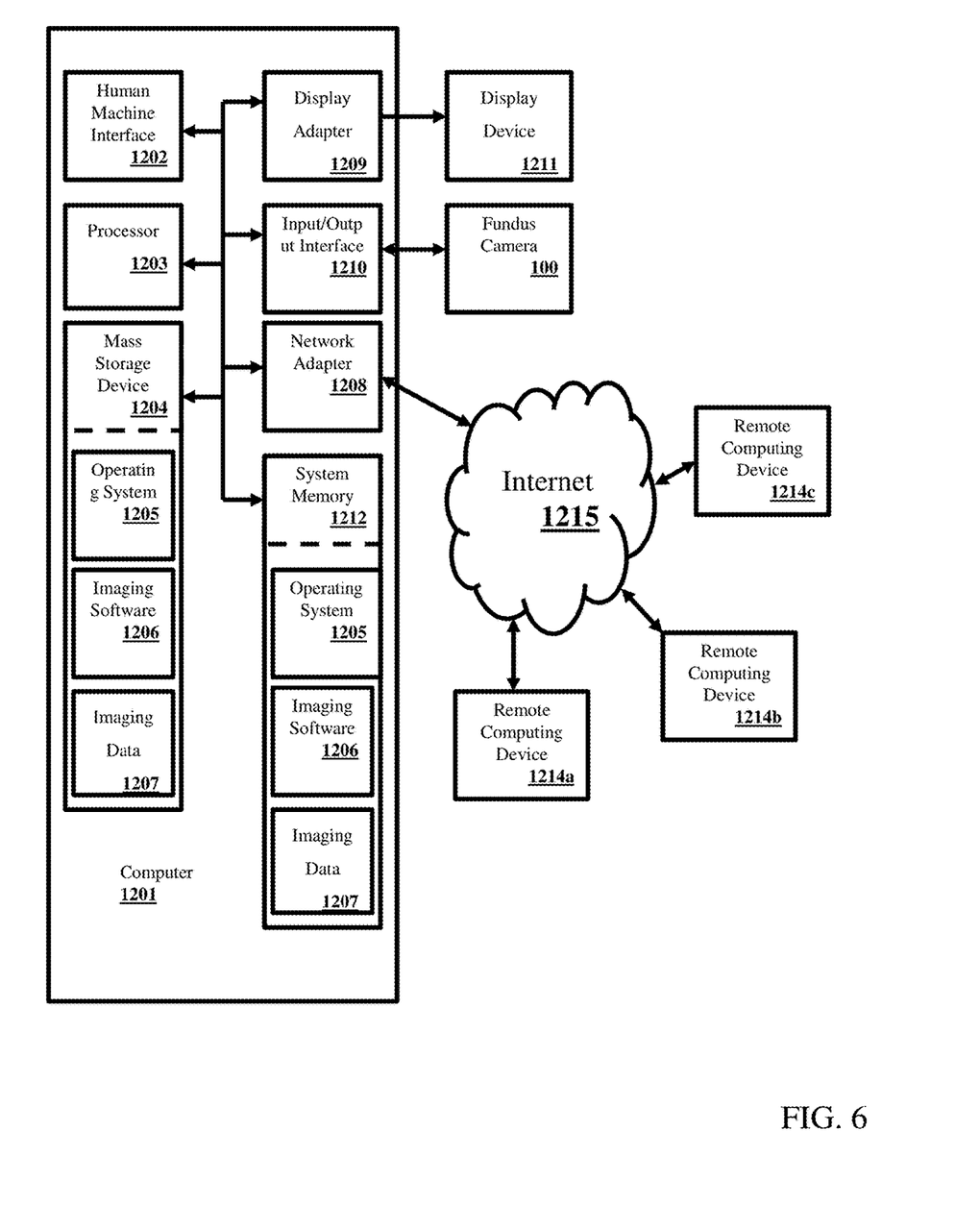
FIG. 6 is shows sample distribution with and without confounder training, according to certain embodiments.

Further, one skilled in the art will appreciate that the systems and methods disclosed herein can be implemented via a computing device, best shown in FIG. 6, in the form of a computer 1201. The components of the computer 1201 can comprise, but are not limited to, one or more processors or processing units 1203, a system memory 1212, and a system bus 1213 that couples various system components including the processor 1203 to the system memory 1212. In the case of multiple processing units 1203, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description can also be implemented over a wired or wireless network connection and each of the subsystems, including the processor 1203, a mass storage device 12012, an operating system 1205, imaging software 1206, imaging data 1207, a network adapter 1208, system memory 1212, an Input/Output Interface 1210, a display adapter 1209, a display device 1211, and a human machine interface 1202, can be contained within one or more remote computing devices 1214a,b,c at physically separate locations, connected through buses of this form, in effect implementing a fully distributed system.

The computer 1201 typically comprises a variety of computer readable media. Exemplary readable media can be any available media that is accessible by the computer 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as imaging data 1207 and/or program modules such as operating system 1205 and imaging software 1206 that are immediately accessible to and/or are presently operated on by the processing unit 1203.

In another aspect, the computer 1201 can also comprise other removable/non-removable, volatile/non-volatile computer storage media. By way of example, FIG. 6 illustrates a mass storage device 12012 which can provide non-volatile storage of computer code, computer readable instructions, data structures, program modules, and other data for the computer 1201. For example and not meant to be limiting, a mass storage device 12012 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 12012, including by way of example, an operating system 1205 and imaging software 1206. Each of the operating system 1205 and imaging software 1206 (or some combination thereof) can comprise elements of the programming and the imaging software 1206. Imaging data 1207 can also be stored on the mass storage device 12012. Imaging data 1207 can be stored in any of one or more databases known in the art. Examples of such databases comprise, DB2®, Microsoft® Access, Microsoft® SQL Server, Oracle®, mySQL®, PostgreSQL®, and the like. The databases can be centralized or distributed across multiple systems.

In another aspect, the user can enter commands and information into the computer 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1203 via a human machine interface 1202 that is coupled to the system bus 1213, but can be connected by other interface and bus structures, such as a parallel port, game port, an IEEE 13912 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computer 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computer 1201 via Input/Output Interface 1210. Any step and/or result of the methods can be output in any form to an output device. Such output can be any form of visual representation, including, but not limited to, textual, graphical, animation, audio, tactile, and the like. In an aspect, a retinal image acquisition device 101 can be coupled to computer 1201 via Input/Output Interface 1210. For example, fundus camera 100 can transfer images captured to the computer 1201 for analysis and storage. In further embodiments, input images earlier acquired a stored on a hard drive or other storage media and are uploaded by way of the Input/Output Interface.

The computer 1201 can operate in a networked environment using logical connections to one or more remote computing devices 1214a,b,c. By way of example, a remote computing device can be a personal computer, portable computer, a server, a router, a network computer, a peer device or other common network node, and so on. Logical connections between the computer 1201 and a remote computing device 1214a,b,c can be made via a local area network (LAN) and a general wide area network (WAN). Such network connections can be through a network adapter 1208. A network adapter 1208 can be implemented in both wired and wireless environments. Such networking environments are conventional and commonplace in offices, enterprise-wide computer networks, intranets, and the Internet 1215.

For purposes of illustration, application programs and other executable program components such as the operating system 1205 are illustrated herein as discrete blocks, although it is recognized that such programs and components reside at various times in different storage components of the computing device 1201, and are executed by the data processor(s) of the computer. An implementation of imaging software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

EXAMPLES

The following examples are put forth so as to provide those of ordinary skill in the art with a complete disclosure and description of certain examples of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Figure 7:
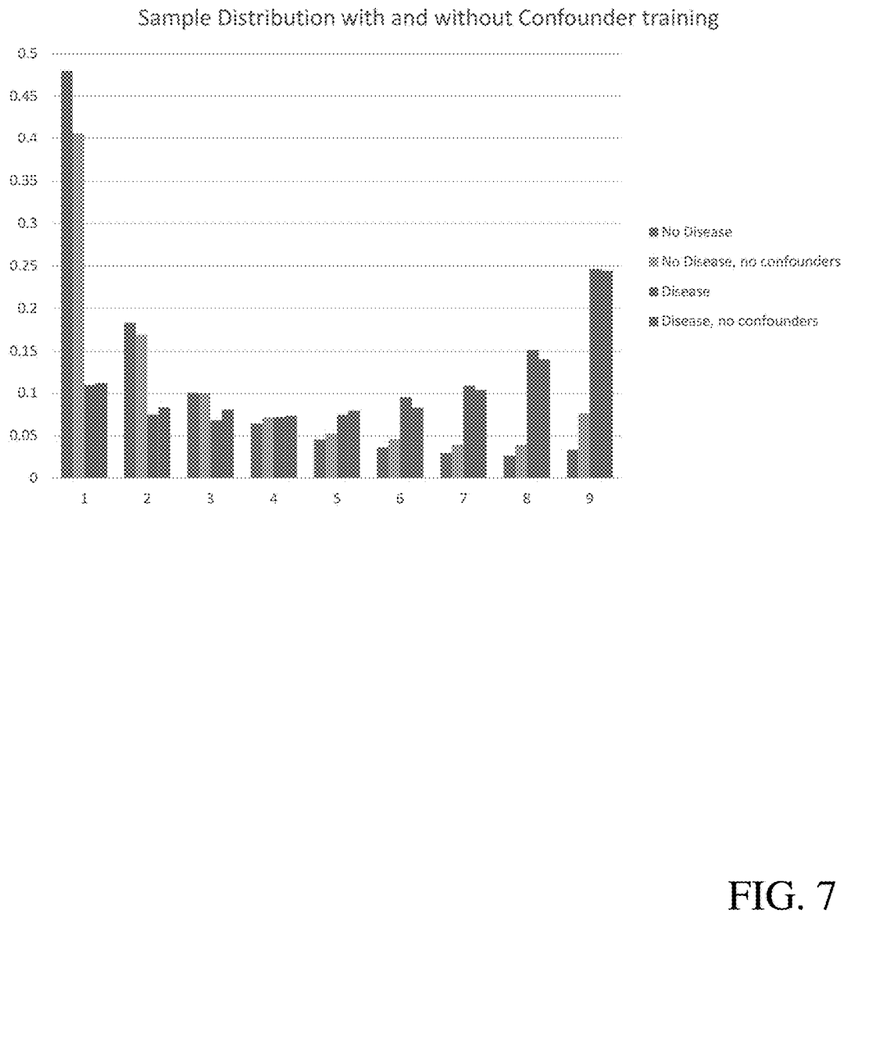
FIG. 7 shows exemplary data of disease detection in retinal images, according to certain embodiments.

FIG. 7 shows sample distribution with and without confounder training. As can be seen, the distribution of both the positive and negative samples improve (more negative samples pulled left and positive samples pushed right). At a threshold of 0.8, ~33.5 samples marked as false positive would be expected. After confounder training, only 19.3 samples are marked as false positive at same threshold. This is done by artificially making the hardest 0.5% of the population 7% of the training population which causes the CNN to focus the training on the hard to train samples.

A confounder sample is a sample that causes a false-positive or false-negative outcome from a CNN. They are difficult to classify correctly because confounder samples often look more like the object that the CNN is detecting versus the background, for example a flash artifact having similar appearance to exudates in a retinal image).

Conventional wisdom in the field suggests that to improve CNN training performance, use more data. This is, in general, a good rule. However, the difficulty with resolving confounder samples is that the features causing the sample to be a confounder are rare within the dataset (again, for example flash artifacts in retinal images). Their rarity means that they have little influence on the CNN optimization. This patent claims that to improve performance on confounders, one should increase their presence in the training data to a level much higher than their representation in the whole of the training data. By inflating their relative presence in the training data, one is effectively increasing their influence on the CNN optimization.

To illustrate this, an experiment was run using a CNN that detects the presence of exudates in a retinal image. First, a CNN was trained using a random sampling of samples from the training data. The CNN was then applied on the training data to find false positive samples, positive confounders; these samples were added to the training data from the original training to create the "confounder-enhanced training dataset." To compare, additional samples were randomly added to the training dataset to create the "random-enhanced training dataset." The CNN was then retrained against the confounder-enhanced training dataset and the random-enhanced training dataset to compare the effects of confounder training versus random addition of data to the training dataset.

Figure 8:
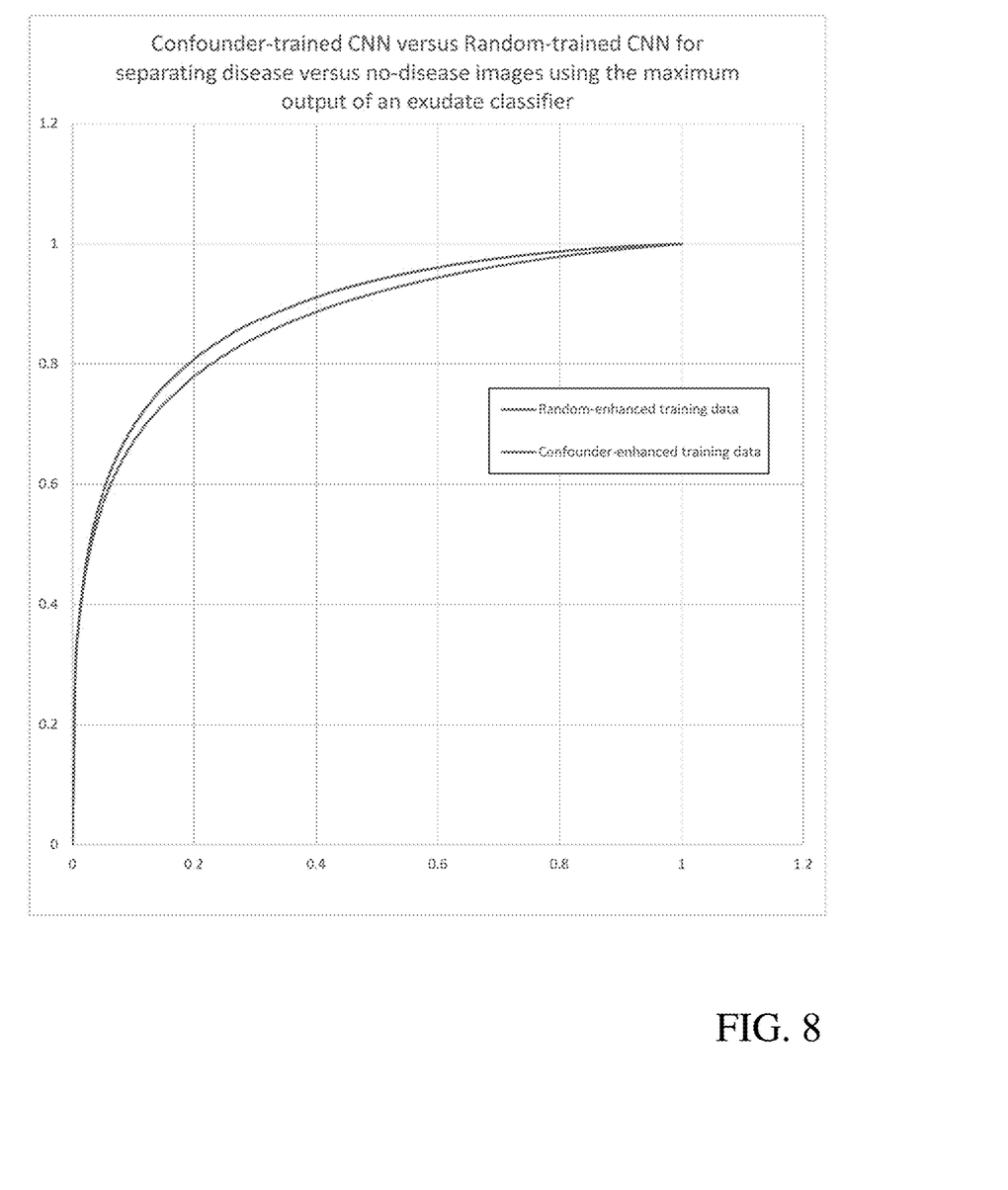
FIG. 8 shows exemplary data of disease detection in retinal images, according to certain embodiments.

The results (shown in FIG. 8) illustrate that after random addition of samples, the specificity (given a sensitivity of 99%) was estimated at 98.36%. Using the confounder-enhanced training dataset, the specificity (given a sensitivity of 99%) was estimated at 98.64%. This is a reduction in the false-positive noise by 17.1% for classifications at the pixel-level.

To illustrate that this can enable better image-level classifications, images in a test set were stratified into disease and no-disease based on the maximum response of the CNN in the image (results were spatially blurred to remove isolated maxima). An ROC was created from the maximum response values. The AUC for the confounder-enhanced training data was 0.886 versus 0.869 for the random-enhanced training data.

Although the present invention has been described with reference to preferred embodiments, persons skilled in the art will recognize that changes may be made in form and detail without departing from the spirit and scope of the invention.

What is claimed is:

1. A method for training a neural network to detect features in a retinal image comprising:
    a) extracting one or more Features Images from a Train_0 set, a Test_0 set, a Train_1 set and a Test_1 set;
    b) combining and randomizing the Feature Images from Train_0 and Train_1 into a training data set;
    c) combining and randomizing the Feature Images from Test_0 and Test_1 into a testing dataset;
    d) training a plurality of neural networks having different architectures using a subset of the training dataset while testing on a subset of the testing dataset;
    e) identifying the best neural network based on each of the plurality of neural networks performance on the testing dataset;
    f) inputting images from Test_0, Train_1, Train_0 and Test_1 to the best neural network and identifying a limited number of false positives and false negative and adding the false positives and false negatives to the training dataset and testing dataset; and
    g) repeating steps d)-g) until an objective performance threshold is reached.

2. The method of claim 1, wherein the step (a) further comprises sampling a region of interest (ROI).

3. The method of claim 2, wherein sampling is performed by random sampling.

4. The method of claim 2, wherein sampling is performed by grid sampling.

5. The method of claim 2, further comprising resampling the images of Train_0, Test_0, Train_1 and Test_1 after the completion of step (e) with a sampling method different from the sampling method performed in the initial sampling.

6. The method of claim 1, wherein the images undergo preprocessing prior to the step of extracting one or more Feature Images.

7. The method of claim 1, wherein the objective performance threshold is softmax_loss or accuracy.

8. The method of claim 1, further comprising:
a) creating a spatial distribution of features in an image; and
b) inputting the spatial distribution of features into a neural network trained according to steps (a)-(f), wherein the output of the neural network is disease diagnosis.

9. The method of claim 8, wherein the spatial distribution of features is a heat map.

10. The method of claim 8, the spatial distribution of features is a point-wise output from feature detection.

11. The method of claim 8, wherein the step of creating a spatial distributions of features in an image further comprises creating scalar features.

12. The method of claim 11, wherein the scalar features are created as histograms.

13. The method of claim 11, further comprising training a machine learning algorithm, wherein the input is scalar features and the output is disease diagnosis.

14. A system for detecting lesions in a retinal image comprising:
a) a feature extractor, configured to receive retinal image input from a user, and further configured to extract image features from the retinal image;
b) a multilevel neural network, trained according to the steps of:
i) extracting one or more Features Images from a Train_0 set, a Test_0 set, a Train_1 set and a Test_1 set;
ii) combining and randomizing the Feature Images from Train_0 and Train_1 into a training data set;
iii) combining and randomizing the Feature Images from Test_0 and Test_1 into a testing dataset;
iv) training a plurality of neural networks having different architectures using a subset of the training dataset while testing on a subset of the testing dataset;
v.) identifying the best neural network based on each of the plurality of neural networks performance on the testing dataset;
vi) inputting images from Test_0, Train_1, Train_0 and Test_1 to the best neural network and identifying a limited number of false positives and false negative and adding the false positives and false negatives to the training dataset and testing dataset; and
vii) repeating steps iv)-vii) until an objective performance threshold is reached;
and configured to receive image features from one or more feature extractor, and further configured to output scalar image features; and
c) a machine learning program, configured to receive scalar image features from the multilevel neural network b) and further configured to output disease diagnosis.

15. The system of claim 14, wherein the image features are spatial distributions of image features.

16. The system of claim 14, where the feature extractor a) is itself a multilevel neural network.

17. The system of claim 14, wherein the feature extractor a) or the multilevel neural network b) are Convolutional Neural Networks.

18. The system of claim 15, wherein the spatial distributions are heat maps or point-wise outputs.

* * * * *

UNITED STATES PATENT AND TRADEMARK OFFICE
CERTIFICATE OF CORRECTION

PATENT NO.         : 10,115,194 B2
APPLICATION NO.    : 15/092421
DATED              : October 30, 2018
INVENTOR(S)        : Niemeijer et al.

Page 1 of 1

It is certified that error appears in the above-identified patent and that said Letters Patent is hereby corrected as shown below:

On the Title Page

There is a typo in one of the inventor's name: "Warrent Claride" should read: "Warren Clarida"

Signed and Sealed this
Twelfth Day of March, 2019

Andrei Iancu
*Director of the United States Patent and Trademark Office*